June 25, 1968  S. T. BRAUNHEIM ET AL  3,389,790
UTENSIL SORTING APPARATUS

Filed April 15, 1966  2 Sheets-Sheet 1

INVENTOR.
GEORGE J. REBANE
STEPHEN T. BRAUNHEIM
BY
AGENT

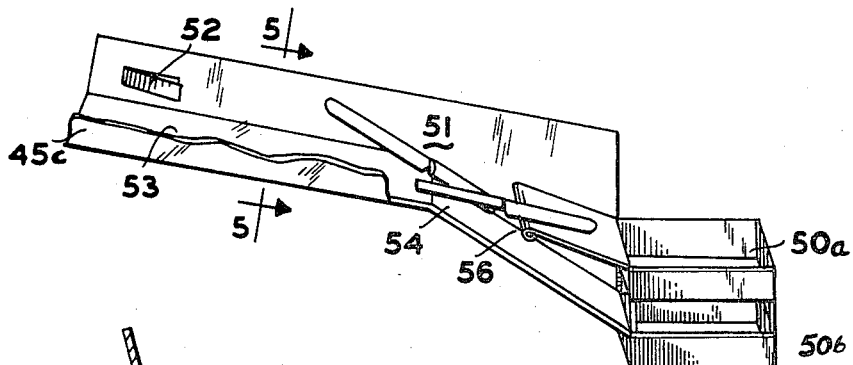
FIG. 5   FIG. 4
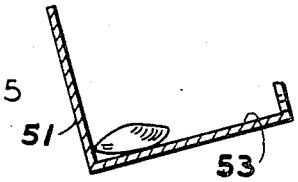
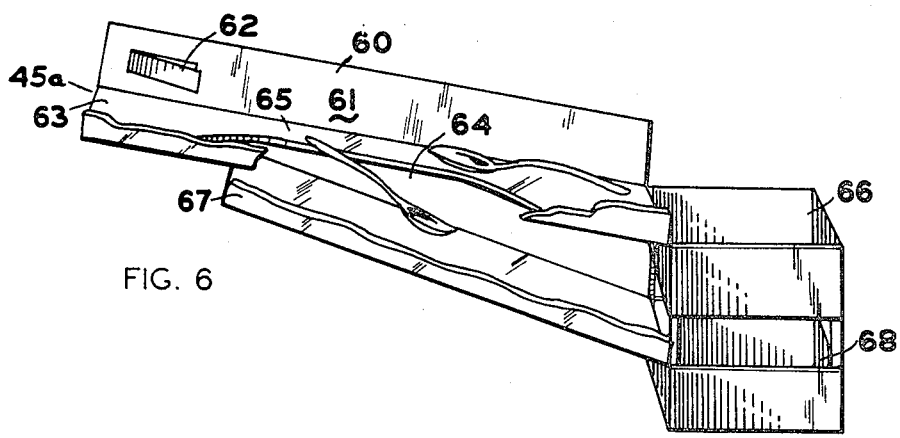
FIG. 6
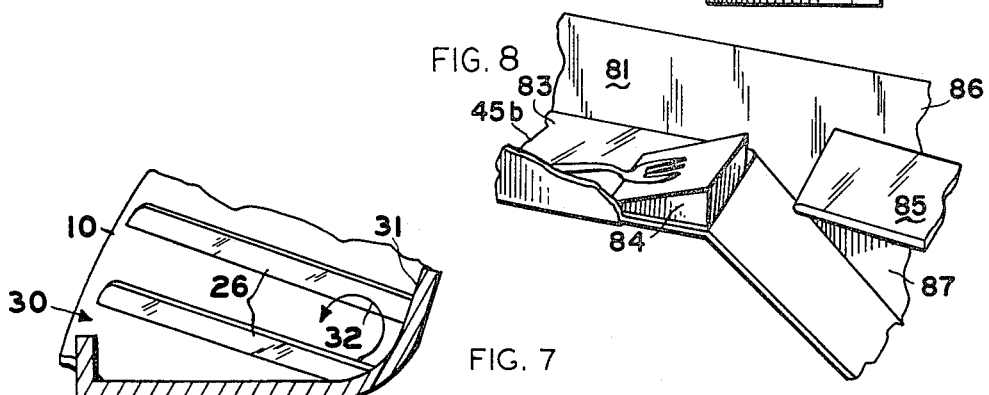
FIG. 7
INVENTOR.
GEORGE J. REBANE
STEPHEN T. BRAUNHEIM
BY
AGENT

United States Patent Office 3,389,790
Patented June 25, 1968

3,389,790
UTENSIL SORTING APPARATUS
Stephen T. Braunheim, 4328 Los Feliz Blvd., Los Angeles, Calif. 90027, and George J. Rebane, 3216 Sherwood Ave., Alhambra, Calif. 91801
Filed Apr. 15, 1966, Ser. No. 542,868
7 Claims. (Cl. 209—97)

ABSTRACT OF THE DISCLOSURE

Apparatus for receiving assorted utensils and for sorting them as to type and to polarity of each type, so that each output hopper will contain a plurality of only one type of utensil with all handles adjacent one end of the hopper. A drum classifier picks up a single utensil and, by passing it over a multi-slotted shield, sorts out each type according to its length. The utensil then passes into a polarizer that sorts the handle end from the working end by the position of the center of gravity of the utensil.

---

Figure 1:
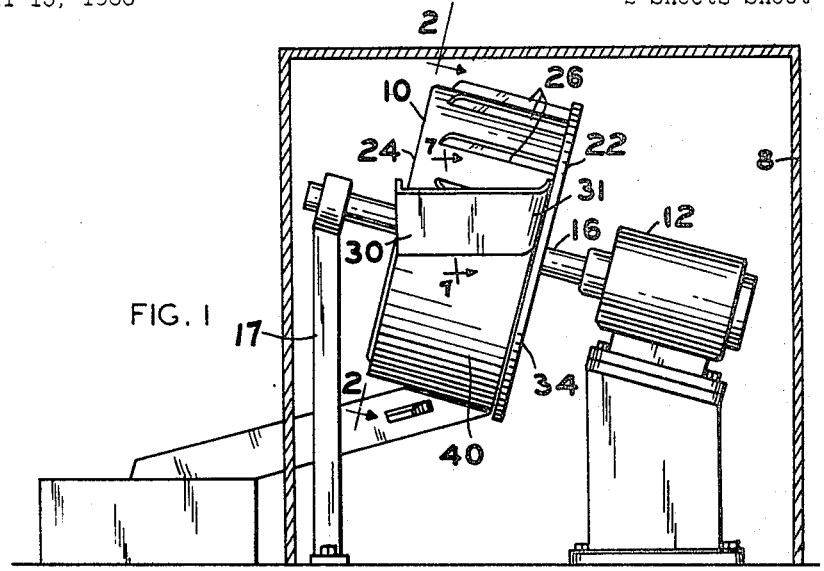

This invention relates to sorting apparatus, and more particularly to a novel and improved automatic tableware utensil sorter which is capable of sorting a large quantity of tableware utensils, such as knives, forks and spoons which are thoroughly integrated.

The term "sorting," as used in this specification, is defined as meaning that all the knives, forks, and spoons, or other eating utensils, are separated from one another, i.e., each knife, fork and spoon is placed in its own respective receiving tray. Likewise, when the term "polarizing" is used herein, it is defined as placing all the utensils in common alignment, for example, placing all the handles of the knives, forks, and spoons in the same direction.

Heretofore, when a large quantity of tableware utensils was used in restaurants, or cafeterias, or places of the like, there was always the slow and cumbersome task of sorting and polarizing the utensils after they have been subjected to a dishwashing machine, or the like. Such a task has always been slow and time consuming, because until the advent of the present invention it has generally been a manual operation. Such manual operations normally require a number of kitchen help to take the tableware utensils after they have been washed and dried, and hand sort and polarize them, thereafter placing them in their respective receiving trays. Such manual handling by kitchen help might run into quite an expense.

Continuous handling by human beings has an added disadvantage in that it is unsanitary. The present invention is further advantageous in this respect, in that it is seldom necessary for human hands to touch the utensils after they have been taken out of the dishwashing machine or a sterilizer, or the like, and placed into the apparatus of the present invention.

By this invention mechanized apparatus has been developed which is not only capable of sorting either wet or dry utensils, such as knives, forks, and spoons from each other, but also capable of polarizing the individual utensils. Such automation provides faster sorting of tableware utensils than heretofore known, and of course, much faster than the hereinabove mentioned manual sorting and facing techniques.

Briefly described, this invention provides tableware utensil sorting apparatus comprising a sorting means including a rotatable classifier drum which is tiltable, mounted on its cylindrical axis and has a plurality of fins extending normal to the outside tangency of the drum and being parallel to the drum cylindrical axis. A hopper is provided to feed the utensils between the fins of the drum, whereby each fin picks up one or more utensils as the drum rotates. As the drum rotates, and because of the tilt thereof, the utensils within the fins of the drum will gravitate down the fins toward a ledge at the bottom of the drum. A stationary shield is provided around the bottom half of the drum on the outside thereof, and provides a compartment in which each utensil is confined. This compartment is defined by the drum, the shield, the fins, and the ledge. The shield contains a plurality of sorting slots, each of which is programmed to pass only utensils of a certain length.

Further, this invention comprises a polarizing means which sorts the tableware utensils according to the direction they are facing. This polarizing means includes a chute leading from each slot in the shield to a gating means which detects the polarity of the utensil and directs the utensil into a particular chute if the handle of the utensil, for instance, is facing in one direction, and directs the utensil into an alternate chute if the handle of the utensil is facing in the opposite direction.

It, therefore, becomes one object of this invention to provide a novel and improved apparatus useful in sorting tableware utensils.

It is another object of this invention to provide tableware utensil sorting apparatus which not only sorts the utensils by their classification, but also by the direction they are facing.

Another object of this invention is to provide a novel and improved utensil sorting apparatus which is fully automatic and much faster than previous methods of sorting tableware utensils.

Another object of this invention is to provide a novel and improvd apparatus useful in sorting tableware utensils, which is more sanitary than most previous sorting methods and techniques.

Figure 2:
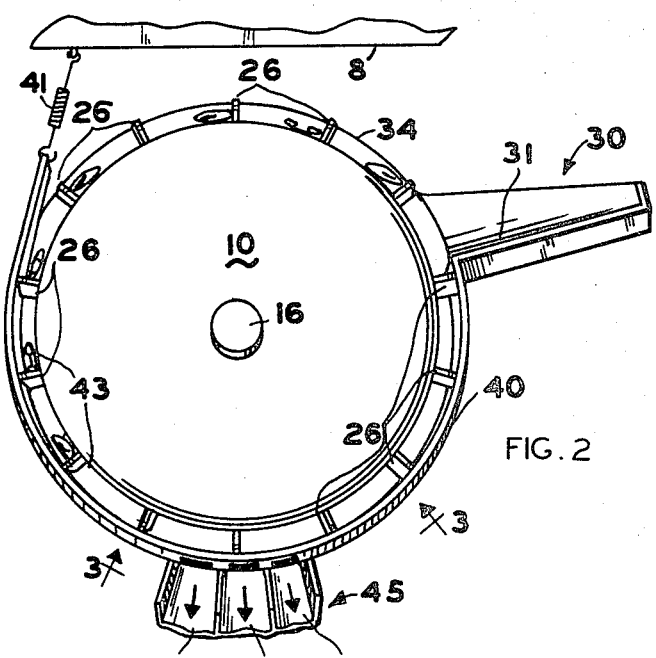
Figure 3:
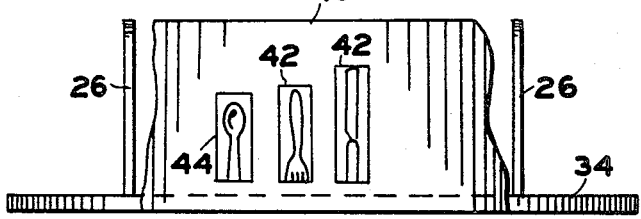

These and other objects and many other atttendant advantages will become apparent and within the scope of this invention when taken in consideration with the accompanying drawings which illustrate only one embodiment of this invention and wherein:

FIGURE 1 shows a perspective view of this invention showing a preferred embodiment thereof, FIGURE 2 illustrates a side view taken along the lines 2—2 of FIGURE 1, illustrating the position of the hopper and shield used with the preferred embodiment of this invention, FIGURE 3 illustrates a fragmentary section of the shield taken along the lines 3—3 of FIGURE 1, illustrating the various slots for the various tableware utensils, FIGURE 4 illustrates a sectional view of the chutes and utensil drop used for facing knives and utensils or the like, FIGURE 5 illustrates a section view of the chutes taken along the lines 5—5 of FIGURE 4, FIGURE 6 shows a view of the chute and utensil drop used for facing forks, spoons and utensils, or the like, FIGURE 7 is a section view taken along the lines 7—7 of FIGURE 1; and FIGURE 8 is a section view illustrating another embodiment of the chute and utensil drop used for facing roks, or the like.

Turning now to a more detailed description of the preferred embodiment shown in the accompanying drawings and especially FIGURES 1 and 2, the numeral 8 denotes a cabinet which houses a classifier drum 10. Within cabinet 8 a drum 10 is rotated at approximately 5 r.p.m. by a motor 12. Drum 10 is mounted at an angle, as shown in FIGURE 1, which should be at least 12°.

Drum 10 which may have a diameter of two feet and a length of one foot, has a plurality of fins 26 protruding longitudinally on the outer surface from one end of drum 10 to the other. Fins 26 may have a height of two inches and are preferably made of a semi-rigid material, such as hard rubber, or the like.

A hopper 30 capable of holding a large quantity of utensils, is provided adjacent drum 10, but is not tilted, as is drum 10. Hopper 30 has a curved wall 31, having an approximate radius of curvature of three inches, as shown in FIGURE 7. The purpose of this curved wall 31 is to force the utensils in hopper 30 to be continuously rolled and stirred by the action of fins 26, as shown by arrows 32. Hence the rolling utensils are forced towards the drum 10 and fins 26, which protrude therefrom. Such stirring and turning of the utensils causes them to continuously be placed in position so that fins 26 are capable of picking up a utensil.

A disk having a diameter approximately four inches greater than that of drum 10 is attached to the drum to provide a ledge 34 around the periphery of end 22. Because of the slant of drum 10, caused by its being tilted on its rotational axis, utensils picked up by fin 26 from hopper 30 will gravitate down the drum 10 upon fin 26 and will be indexed at the ledge 34 on the lower end 22 of drum 10.

A shield 40 is provided on the lower end 22 of drum 10 and extends around the lower periphery of drum 10. Shield 40 is preferably made of a flexible type material, such as fiberglass, and is spring-loaded by the spring 41 to supply some resiliency thereto. As the drum 10 rotates, compartments are formed between adjacent fins 26, drum 10, shield 40, and ledge 34. Each compartment 43 is capable of confining a utensil. The purpose of the resiliency provided by the spring-loaded shield 40 is to assure close contact between the fins and the shield, and also to provide a safety feature, for if a utensil should be caught between the shield 40 and one of the protruding fins, it will not damage the equipment, but will tend to push the shield out and allow the misplaced utensils to continue on.

As shown in FIGURE 3, a plurality of slots 42 of varying length are provided in shield 40. As drum 10 rotates, the compartments formed by the drum, fins and shield pass over slots 42 and convey the utensils over slots 42. The various lengths of slots 42 provide the sorter wherein those utensils of only certain lengths will drop through slots 42 which are large enough therefor. By proper programming of slots 42 by placing the smaller slots first relative to the rotation of the drum 10, only selected utensils will be dropped through specific slots. Spoons which are generally smaller in length than most tableware utensils will drop through the first slop 44, while knives and forks and other larger utensils will pass over slot 44. This is because there is a bottom ledge on shield 40 on the lower end of slot 44, thereby allowing the larger utensils to bridge the smaller slots.

This ledge should be of sufficient length to keep such utensils, such as forks and spoons, from having their bowls and tines, etc. from dropping or protruding below the lower level of ledge 44. If such would happen it could bind up between the fins 26 and the slot 44 in shield 40. Thus, it can be seen that by proper programming of the slots 42 each utensil can be classified by their particular length.

Further, as the utensils drop through slot 44 of shield 40, they are sent down conduits in the form of chutes 45. In this particular embodiment chute 45a is provided for spoons, chute 45b is provided for forks, and chute 45c is provided for knives. It should be understood that other slots and corresponding chutes may be provided for other corresponding tableware utensils, such as soup spoons, tablespoons, salad forks, etc., as long as the different utensils are of different length. The invention is not to be limited to the three slots shown in this embodiment of this invention.

Referring now to FIGURE 4, there is shown a fragmentary section of, for example, a chute 45c, which is used to deliver knives to their receiving receptacles 50a and 50b. It can be seen, by referring to FIGURE 5, which is a cross-section of the view shown in FIGURE 4, that chute 45c, as well as chute 45a and 45b, are canted. This assures that the utensils will gravitate against wall 51 of chute 45c. A protrusion 52 extends from the wall 51. In this embodiment such a protrusion is accomplished by cutting a tab from the wall 51 and bending the tab into the chute. This tab, or protrusion 52, extending from wall 51 will assure any tableware coming down chute 45 of laying flat on the bottom wall 53 of chute 45. Bottom wall 53 of chute 45c has a slot 54 formed between the end of bottom wall 53 and a panel 55 which is substantially coplanar with bottom wall 53, and which forms the bottom wall of a conduit which leads to receptacle 50b. By proper spacing of the panel 55, a knife, which is coming down handle first, has its center of gravity forward of its physical center and this heavier end will drop into the slot 54. On the other hand, if the knife is coming down blade first, which is much lighter, its center of gravity is behind the physical center and the lighter blade end will bridge slot 54 and continue on down into the receptacle 50a. Thus, there is provided herein a means of polarizing the knives and placing them into specific receiving receptacles, depending upon whether they come down the chute 45c handle first or blade first.

Chutes 45a, which transmit utensils having configuration such as spoons, has a protrusion 62 in the side wall 61 similar to protrusion 52 in side wall 51 of chute 45c. Bottom wall 63 of chute 45a has a cut-a-way portion 64 which leaves a narrow shelf 65 close to the wall 61. The shelf 65 must be designed to be narrower than one half the width of the bowl of the spoon so that the center of gravity of the bowl will be positioned over the cut-a-way portion 64. However, the shelf 65 must be sufficiently wide to support the center of gravity of the handle section of the spoon. Because the chute 45a is canted, as shown in FIGURE 5, the speed and weight of the spoon passing down chute 45a handle first, will cause the spoon to be supported by the narrow shelf 65, and it will be deposited in receiving receptacle 66.

FIGURE 8 illustrates another embodiment of a chute and utensil drop which is particularly useful in facing forks, or other utensils of similar configuration wherein one end is substantially wider than the other end. This chute is similar to that shown in FIGURE 4, except that a wedge or ramp 84 is positioned on the bottom wall 83, and is spaced from the side wall 81 so that the narrow end, or handle, of the utensil will pass into that space without being lifted by ramp 84. Bridging chute 45b and positioned below ramp 84 is a panel 85 which forms the floor of conduit 86 and the ceiling of conduit 87, which respectively lead into receiving receptacles.

If, for example, a fork is passing down chute 45b handle first, the handle will pass into the space between ramp 84 and sidewall 81 and will direct the fork under panel 85, thus committing the utensil to conduit 87. If the fork is passing through chute 45b, tine end first, the tine end being wider will not fit into the space between ramp 84 and sidewall 81 and will thus be lifted by ramp 84 and will jump from the ramp to the top of panel 85 where the fork will pass through conduit 86.

Thus it can be seen by this invention that a unique apparatus has been constructed which will sort tableware utensils and separate the different types of tableware as they are classified by their length, with this invention providing a plurality of output chutes which divide the tableware by their classification, and, for instance, segregating the knives, forks and spoons, etc. from each other.

Having thus described one embodiment of this invention, it is to be understood that many modifications can be made to this apparatus without departing from the spirit and scope thereof, and that this invention is intended to include such modifications, and having thus described only one embodiment of this invention, what is claimed is:

1. Apparatus useful for sorting utensils, or the like, comprising: classifier means including a plurality of slots of varying sizes; conveying means for causing utensils to pass over the slots in said classifier means, wherein utensils of specific length will drop into their respective slots; and means for accumulating the classified utensils, said accumulating means being disposed so that the classified utensils will pass from the slots in said classifier means into said accumulating means; said conveying means including:

- a drum tiltably mounted to rotate upon its cylindrical axis;
- index means circumferentially positioned adjacent the lower end of said tiltably mounted drum;
- drive means for rotating said drum, said drive means being coupled to said drum;
- a plurality of fins protruding from the outer circumference of said drum and being disposed parallel to the cylindrical axis of said drum; and
- supply means for feeding utensils between the fins of said drum as said drum rotates, wherein the utensils will gravitate between said fins on said tilted drum to said index means, said supply means being disposed adjacent to said drum.

2. The apparatus, as defined in claim 1, wherein said classifier means includes:

- a shield arcuately located adjacent the lower periphery of said tiltably mounted drum, said plurality of fins protruding from said drum being capable of contacting said shield as said drum rotates, thereby defining individual compartments for utensils between said fins.

3. The apparatus, as defined in claim 1, wherein said means for feeding utensils between each of the fins of said drum includes:

- a hopper located substantially adjacent said drum for receiving the utensils to be sorted, said hopper being tilted for gravitating utensils against the surface of said drum and between the fins of said drum.

4. The apparatus, as defined in claim 1, wherein said means for accumulating includes:

- polarizing means for determining the polarity of a utensil and for separating utensils according to their polarity,
- first chute means coupled between said classifier means and said polarizing means for conveying classified utensils to said polarizing means, and
- second chute means coupled to the output of said polarizing means for conveying polarized utensils from the apparatus.

5. The apparatus, as defined in claim 4, wherein said polarizing means comprises:

- a chute having a bottom wall and a side wall, said bottom wall being canted, whereby utensils will be conveyed along the junction of the bottom wall and side wall, and
- a shelf disposed in the bottom wall of said chute, said shelf having a width less than one half the width of the wider end of a utensil and greater than one half the width of the narrower end of the utensil.

6. The apparatus, as defined in claim 4, wherein said polarizing means comprises:

- a chute having a bottom wall and a side wall, said bottom wall being canted, whereby utensils will be conveyed along the junction of the bottom wall and side wall, and
- a panel substantially coplanar with said chute and spaced from the end of said chute to form a slot for receiving only those utensils which pass down said chute with their center of gravity leading their physical center, said panel also forming the bottom of a conduit for receiving those utensils which pass through said chute with their center of gravity behind their physical center.

7. The apparatus, as defined in claim 4, wherein said polarizing means comprises:

- a chute having a bottom wall and a side wall, said bottom wall being canted, whereby utensils will be conveyed along the junction of the bottom wall and side wall, and
- a ramp positioned in the bottom wall of said chute and spaced from the side wall by an amount greater than the narrow end of a utensil and less than the wide end of a utensil, and
- a panel positioned in spaced relation to said ramp, whereby the leading ends of utensils which are lifted by the ramp will budge the space between said ramp and said panel to pass over said panel, and the leading ends of utensils which pass between said ramp and the sidewall of said chute will pass under said panel.

References Cited

UNITED STATES PATENTS

| | | | |
|---|---|---|---|
| 1,985,345 | 12/1934 | Gebhardt | 209—87 |
| 2,583,447 | 1/1952 | Straub | 209—86 X |
| 3,301,397 | 1/1967 | Stutz | 209—73 |

M. HENSON WOOD, JR., *Primary Examiner.*

R. A. SCHACHER, *Assistant Examiner.*